Oct. 25, 1938.　　　　C. CLICK　　　　2,134,438
TRACTOR ATTACHMENT
Filed Aug. 23, 1937　　　　2 Sheets-Sheet 1
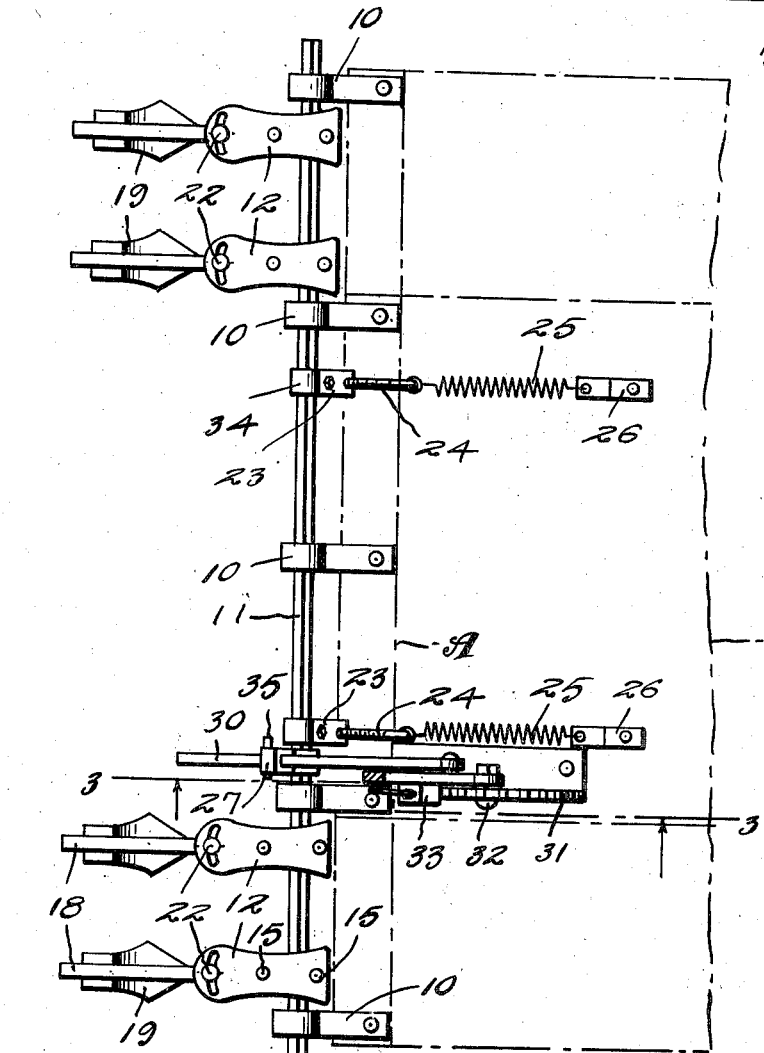
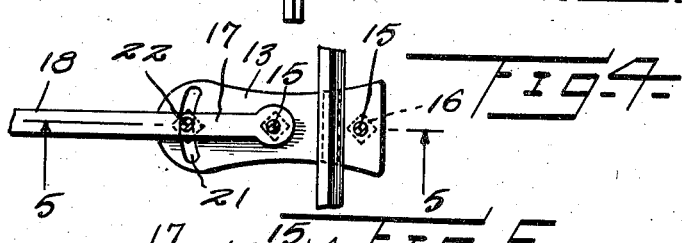
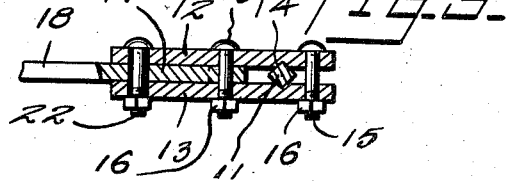
Clyde Click
INVENTOR
BY Victor J. Evans & Co.
ATTORNEYS

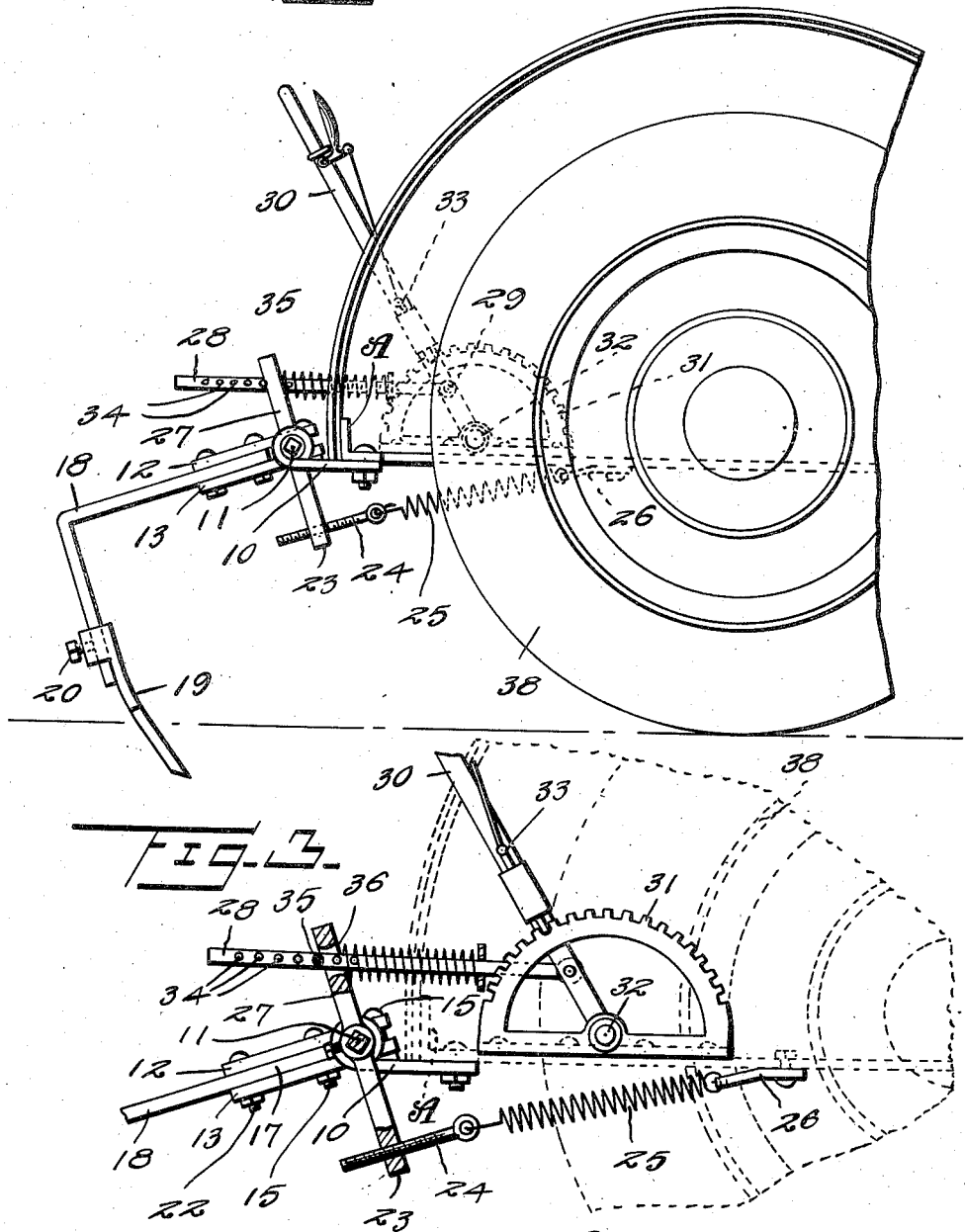

Patented Oct. 25, 1938

2,134,438

UNITED STATES PATENT OFFICE 2,134,438

TRACTOR ATTACHMENT

Clyde Click, Sidney, Nebr.

Application August 23, 1937, Serial No. 160,507

1 Claim. (Cl. 97—47)

The invention relates to a tractor attachment and more especially to a ground working attachment for tractors.

The primary object of the invention is the provision of an attachment of this character, wherein the same when operating functions to close hollows or depressions in the earth as created by the wheels of the tractor, that is to say, the driving wheels, and also its guide wheels, the attachment being novel in form and is readily and easily mounted, the ground engaging elements being readily adjustable for the proper working thereof in association with the tractor.

Another object of the invention is the provision of an attachment of this character, wherein the shovel or sweep is susceptible of adjustment to assure deep or shallow working of the soil and will be sustained under tension to assure digging into hard ground and can be raised and latched in an inactive position with ease and dispatch.

A further object of the invention is the provision of an attachment of this character, wherein the working thereof assures the loosening of the ground behind the rubber tired wheels of a tractor or for filling in ditches left by the wheels, particularly when working on plowed ground, seeding, harrowing or weeding and without interference with the latter operations.

A still further object of the invention is the provision of an attachment of this character, which is simple in its construction, thoroughly reliable and effective in operation, easy of adjustment, strong, durable, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a fragmentary diagrammatic plan view of a tractor of the wheeled rubber tired type showing the attachment constructed in accordance with the invention applied.

Figure 2 is a fragmentary side elevation thereof.

Figure 3 is a sectional view on the line 3—3 of Figure 1.

Figure 4 is a fragmentary detail plan view of the mounting of one of the ground working elements, being partly in section.

Figure 5 is a sectional view on the line 5—5 of Figure 4.

Similar reference characters indicate corresponding parts throughout the several views in the drawings.

Referring to the drawings in detail, A designates generally a horizontally disposed supporting bar adapted to be secured to the rear end of a tractor of the pneumatic tired type, a portion of the tractor being indicated at B and is of standard construction. This bar A is preferably of L shape in cross section and is fixed to the said tractor in any suitable manner for trailing with respect to the same. Fixed at intervals and projecting rearwardly from the bar A are spaced bearing brackets 10 in which is fitted a turning shaft 11 preferably flat faced throughout the extent thereof and carried by this shaft 11 are pairs of upper and lower hanger clamps 12 and 13, respectively, having in their inner faces rearwardly thereof substantially V-shaped seats 14 for accommodating the shaft 11 while passed through these upper and lower clamps 12 and 13 at opposite sides with respect to the shaft 11 are securing bolts 15 carrying nuts 16 so that the said clamps can be made fast upon the shaft. One of these bolts 15, that is to say, the aft one, constitutes a pivot for the flattened upper end 17 of a shovel or sweep arm 18, in this instance it being fitted at its lower end with a shovel 19 adjustable thereon at 20. The clamps 12 and 13 are formed with aligned arcuate shaped slots 21 for accommodating an adjusting bolt 22 carried by the arm 18 and in this manner the latter is laterally adjusted, being pivotally movable either inwardly or outwardly in a lateral direction.

Fixed to the shaft 11 on opposite sides of the longitudinal center or axis of the tractor B are the depending brackets 23, each having threaded therein an eye bolt 24 with which is connected one end of a coiled tensioning spring 25, the latter being also fixed at its upper end at 26 to the tractor and this spring functions to lower the shovels 19 for engagement with the ground for the working thereof.

The shaft 11 next to one of the brackets 23 has fixed thereto an arm 27 through which is passed a coupling shank 28 pivoted at 29 to a throw lever 30. This lever 30 is swingingly pivoted at 31 to a rack keeper segment 32 stationarily fitted on the tractor B and carries a spring urged hand releasable latch 33 for coaction with the keeper 31 in the fastening of the lever 30 in its adjusted position. The shank 28 has provided therein a series of spaced holes 34 for selective adjustment of a stop pin 35 against which works the arm 27, the latter being held in contact therewith under the tension of the springs 25 and this arm 27 being provided with the clearance hole 36 for the said shank 28.

The shovels 19 of the attachment follow in the path of the rubber tired rear wheels 37 of the tractor B and work the ground so as to close the ditch or channel as created by each wheel in the advancement of the tractor. On the working of the lever 30 in one direction and the latching thereof, the shovels 19 will be held in an inactive position then by adjusting the said lever 30 in a reverse direction regulates the depth of cut of the shovels 19 when the tractor is advanced and these shovels have been lowered into ground working position.

The springs 25 function to tension the shovels 19 and also will absorb shocks and vibrations incident to the travel of the tractor when the shovels 19 are in working position.

What is claimed is:

An attachment for a wheeled tractor having a chassis frame, comprising bearings fixed to the aft portion of said frame, a shaft disposed transversely of the frame and fitting said bearings, said shaft being of square formation in cross section, hanger clamps including superposed plates having registering V-shaped seats in their inner faces for engaging said shaft, arms bolted between the plates of said hanger clamps and swingably adjustable in a lateral direction, ground working elements adjustably fitting said arms, means tensioning the said shaft for urging the same in a direction for the sinking of the ground working elements in soil, a throw lever pivoted to the chassis frame, a keeper for said throw lever, an arm fixed to the said shaft and having a clearance, a coupling shank pivoted to the lever and received in said clearance, an adjustable pin fitting said coupling shank for abutment of the last-mentioned arm therewith, and a spring coacting with the shank and urging the last-mentioned arm in contacting relation with the pin.

CLYDE CLICK.